United States Patent
Broer

(10) Patent No.: US 8,537,014 B2
(45) Date of Patent: Sep. 17, 2013

(54) RFID TAG MOVEMENT DETERMINATION

(75) Inventor: Dirk A. Broer, Silver Spring, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 958 days.

(21) Appl. No.: 12/339,457

(22) Filed: Dec. 19, 2008

(65) Prior Publication Data

US 2010/0156651 A1 Jun. 24, 2010

(51) Int. Cl.
*G08B 13/14* (2006.01)
*G01S 13/08* (2006.01)
*G06F 17/00* (2006.01)

(52) U.S. Cl.
USPC .............. 340/572.1; 340/539.13; 342/127; 235/375

(58) Field of Classification Search
USPC ............ 340/572.1–572.8, 539.13, 10.4, 670, 340/568.1, 568.8, 3.51; 342/42, 44, 47, 127; 235/375
See application file for complete search history.

(56) References Cited

U.S. PATENT DOCUMENTS

| | | | |
|---|---|---|---|
| 5,784,686 A | 7/1998 | Wu et al. | |
| 5,920,261 A | 7/1999 | Hughes | |
| 6,046,683 A * | 4/2000 | Pidwerbetsky et al. | 340/10.4 |
| 6,356,230 B1 | 3/2002 | Greef | |
| 7,075,437 B2 | 7/2006 | Bridgelall et al. | |
| 7,170,412 B2 * | 1/2007 | Knox et al. | 340/572.1 |
| 7,298,264 B1 * | 11/2007 | Kuzma et al. | 340/572.1 |
| 2004/0160310 A1 * | 8/2004 | Chen et al. | 340/10.2 |
| 2005/0190098 A1 | 9/2005 | Bridgelall et al. | |
| 2006/0220861 A1 | 10/2006 | Stobbe et al. | |
| 2007/0096919 A1 | 5/2007 | Knadle, Jr. et al. | |
| 2007/0205896 A1 | 9/2007 | Beber et al. | |
| 2008/0157970 A1 | 7/2008 | Single et al. | |
| 2008/0291041 A1 | 11/2008 | Chakraborty | |

FOREIGN PATENT DOCUMENTS

| | | |
|---|---|---|
| GB | 2312801 A | 11/1997 |
| WO | WO2005091013 A1 | 9/2005 |

OTHER PUBLICATIONS

PCT Search Report Dated Mar. 30, 2010.
International Preliminary Report on Patentability and Written Opinion for counterpart International Application No. PCT/US2009/068384 mailed on Jun. 30, 2011.

* cited by examiner

*Primary Examiner* — Anh V La
(74) *Attorney, Agent, or Firm* — Steven A. May

(57) ABSTRACT

A system, techniques, and apparatus for determining RFID tag movement are disclosed. The system includes an RFID reader that is configured to detect an RFID tag's motion by comparing backscattered signals received from the tag. The system can also generate and filter alerts according to predefined business rules based on the detection.

19 Claims, 5 Drawing Sheets

RFID TAG MOVEMENT DETERMINATION

TECHNICAL FIELD

This disclosure relates to radio frequency identification (RFID) technology, and more particularly to detecting RFID tag movement.

BACKGROUND

Radio frequency identification (RFID) tags are electronic devices that can be affixed to items whose presence is to be detected and/or monitored. The presence of an RFID tag, and therefore the presence of the item to which the tag is affixed, can be interrogated and monitored wirelessly by devices known as RFID readers. Readers typically have one or more antennas transmitting radio frequency signals to which tags respond.

Efficient communication between tags and readers has become a key enabler in supply chain management, especially in manufacturing, shipping, and retail industries.

One need that has arisen in the context of supply chain management is a desire to have knowledge of tag movement within a coverage area (e.g., the area within which the reader can receive signals transmitted from tags).

Such detection can be important for accurate inventory counting as well as security applications by determining whether an item is entering or leaving an area.

Accordingly, there is a need for effective RFID tag detection.

SUMMARY

A system, techniques, and apparatus for determining RFID tag movement are disclosed. The system includes an RFID reader that is configured to detect an RFID tag's motion by comparing backscattered signals received from the tag. The system can also generate and filter alerts according to predefined business rules based on the detection.

Various aspects of the system relate to detecting movement of RFID tags.

For example, according to one aspect, a method of detecting movement of a RFID tag includes transmitting a plurality of RF signals from at least one RFID reader to the RFID tag, receiving at least two modulated backscattered signals from the tag in response to the transmission of signals, comparing the at least two backscattered signals to one another, and detecting movement of the RFID tag based on the comparison. Preferably, the method includes singulating the RFID tag prior to comparing the two modulated backscattered signals.

In one embodiment, comparing the two back scattered signals includes calculating a return signal strength indicator (RSSI) and/or return signal phase angle for each of the backscattered signals, comparing the RSSI and/or phase angle of each backscattered signal to one another, and detecting movement of the RFID tag if the RSSI and/or phase angle calculated for each backscattered signal differ from one another. In an embodiment, calculating the phase angle includes calculating an in-phase (I) and quadrature (Q) signal for each backscattered signal.

In another embodiment, the method can further include receiving the two modulated backscattered signals on an antenna of the RFID reader, and calculating a velocity of the tag relative to the antenna. The method can also include smoothing the two modulated backscattered signals.

In one embodiment, the method also includes generating an alert based on detecting movement of the tag, and processing the alert using a business rule. The method can include filtering the alert by interrogating a field of the tag in response to detecting movement of the tag. In yet another embodiment, the method includes triangulating a velocity of the tag using a plurality of RFID readers.

In another aspect, an RFID reader includes at least one antenna, a processor, and memory including memory storing instructions that, in response to a request, cause the processor to transmit a plurality of RF signals to an RFID tag through the antenna, compare at least two backscattered signals from the tag to one another in response to transmission of signals through the antenna, and detect movement of the RFID tag based on the comparison.

In yet another aspect, an RFID system includes a plurality of RFID tags, and at least one RFID reader for communicating with the plurality of RFID tags. The at least one RFID reader is configured to transmit a plurality of RF signals to one of the plurality of RFID tags, compare at least two backscattered signals received from the one of the plurality of tags to one another, and detect movement of the one of the plurality of tags based on the comparison.

In one embodiment, the RFID reader calculates at least one of a return signal strength indicator (RSSI) and return signal phase angle for each of the backscattered signals, compares the at least one RSSI and phase angle of each backscattered signal to one another, and detects movement of the one of the plurality of RFID tags if the at least one RSSI and phase angle calculated for each backscattered signal differ from one another.

Various advantages can be obtained using the present invention. For example, the present invention can be used to determine whether an item having an RFID tag affixed thereto is entering or leaving a control area. The present invention can also be used to filter RFID tags to relevant ones. For example, in a retail environment where tagged products may be near a door, determining how fast the products are moving can determine if the product is moving through the door or just on a shelf near the door.

Additional features and advantages will be readily apparent from the following detailed description, the accompanying drawings and claims.

BRIEF DESCRIPTION OF DRAWINGS

Like reference symbols in the various drawings indicate like elements.

DETAILED DESCRIPTION

Figure 1:
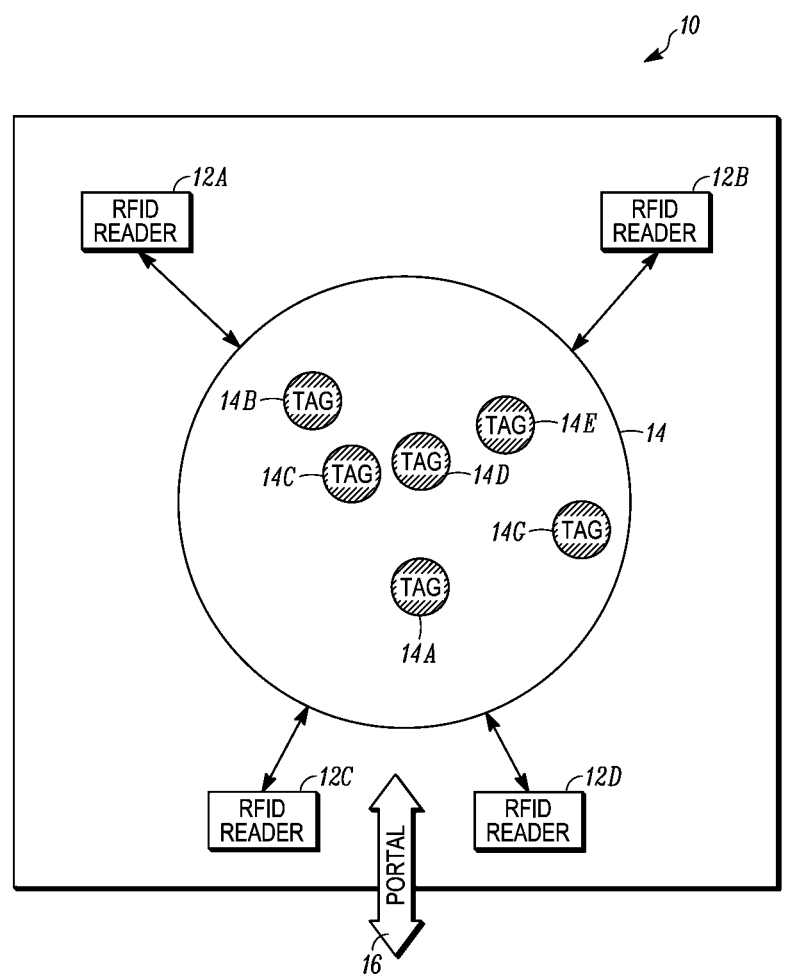
FIGS. 1-3 are schematic views of an exemplary system for detecting RFID tag movement according to the present invention.
Figure 2:
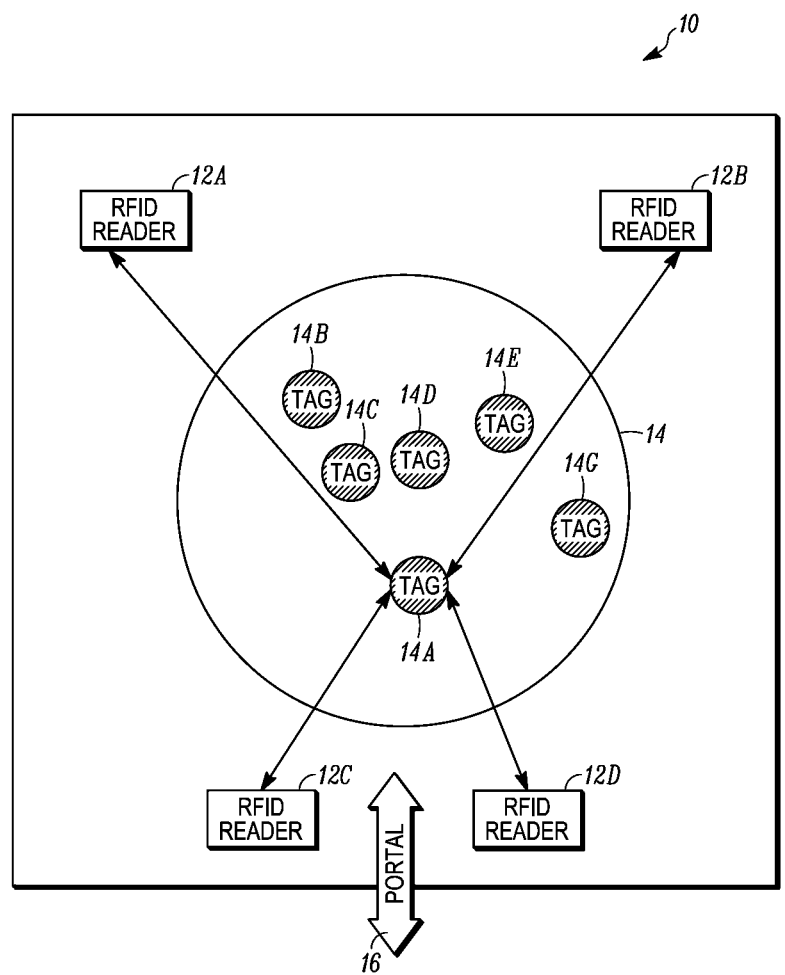
Figure 3:
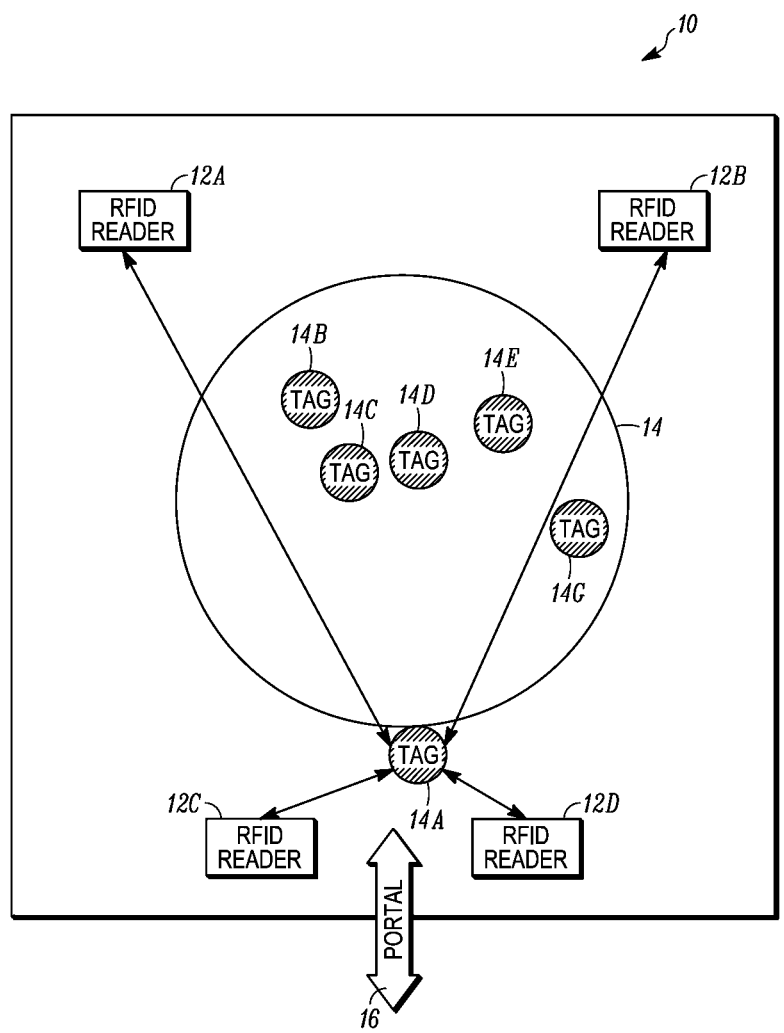

Referring now to FIGS. 1-3, a schematic view of an RFID system 10 for detecting RFID tag movement in accordance with an exemplary embodiment of the present invention is disclosed. As shown in FIGS. 1-3, in one embodiment, a plurality of RFID readers 12A-D are provided that communicate with an exemplary population 14 of RFID tags 14A-G. As shown in FIGS. 1-3, the population 14 of tags includes seven (7) tags 14A-G. Although seven (7) tags 14A-G and four (4) readers are shown in FIGS. 1-3, the system 10 may include any number of RFID tags and one or more RFID readers.

Readers 12A-D may be requested to address the population of tags 14 by an external application. Alternatively, readers 12A-D may have internal logic that initiates communication to the tag population 14. Further, readers 12A-D may communicate with each other in a reader network.

As shown in FIGS. 1-3, in one embodiment, one or more RFID readers 12A-D are located at fixed locations throughout the system 10. In the example shown in FIGS. 1-3, two REID readers 12C-D are located near a control point, such as a portal 16, to detect moving tags. By positioning one or more RFID readers in locations near a control point, the present invention can be used to determine whether additional action should be taken with respect to a moving tag.

In operation of the system 10, one or more of the readers 12A-D transmits an interrogation signal having a carrier frequency to the population of tags 14. Readers 12A-D then singulate on a particular tag. As used herein, the term 'singulate' refers to means by which an RFID reader identifies a tag with a specific serial number from the population 14. This can be important because if multiple tags respond simultaneously to a tag query, the tags can interfere with each other. For example, in a typical commercial application, potentially hundreds of tags might be within range of a particular reader.

Once readers 12A-D singulate on a tag, as shown in FIGS. 2-3, readers 12A-D then transmit an interrogation signal 15A-D having a carrier frequency to a particular RFID tag 14A. Readers 12A-D typically operate in one or more of the frequency bands allotted for this type of RF communication.

Various types of tags 14A-G may be present in tag population 14 that transmit one or more response signals 17A-D to interrogating readers 12A-D, including by alternatively reflecting and absorbing portions of the interrogation signal 15A-D according to a time-based pattern or frequency. This technique for alternatively absorbing and reflecting the interrogation signal is referred to herein as backscatter modulation. Readers 12A-D receive and obtain data from tag response signals 17A-D, such as an identification number of the responding tag 14A. In the embodiments described herein, a reader of the present invention may be capable of communicating with each of the tags 14A-G according to any suitable communication protocol, including Class 0, Class 1, EPC Gen 2, other binary traversal protocols and slotted aloha protocols, and future communication protocols. Additionally, tag population 14 may include one or more tags having the Packed Object format and/or one or more tags not using the Packed Object format (e.g., standard ISO tags).

As described in further detail below, readers 12A-D of the present invention detect movement of RFID tags by analyzing received backscatter modulated signals. In one embodiment, by analyzing two or more backscatter signals, interrogating RFID readers 12A-D can determine both the directionality and the velocity of a particular tag. Furthermore, RFID readers 12A-D of the present invention may also use the received information to perform other functions. For example, one or more of the RFID readers 12A-D may determine that additional information is to be gathered from a singulated tag or trigger a special message to a remote server or process configured to analyze moving tags.

In one exemplary embodiment, readers 12A-D are configured to transmit RF signals at the same time but at different modulated frequencies. By using different frequencies it is possible for the readers 12A-D to transmit at the same time and to then recognize the backscattered signal that matches their own frequency. For example, referring to FIGS. 2-3, reader 12C may use the time of arrival of the backscattered signal 17C with a first frequency to represent the range from reader 12C to tag 14A and back to reader 12C. Similarly, reader 12D may use the time of arrival of the backscattered signal 17D with a second frequency to represent the range from reader 12D to tag 14A and back to reader 12D. Reader 12A may use the time of arrival of the backscatter signal 17A with a third frequency to represent the range from reader 12C to tag 14A and back to reader 12C. Likewise, reader 12B may use the time of arrival of the backscatter signal 17B with a fourth frequency to represent the range from reader 12B to tag 14A and back to reader 12B. These times of arrival measurements together with the readers' position information can then be transmitted to one of the readers for calculating the tag velocity and position using triangulation and geometric methods. Of course, it will be appreciated by one skilled in the art that a single interrogating reader having a plurality of antenna for transmitting and receiving RF signals can also be used for calculating tag velocity and position using triangulation and geometric methods.

In an embodiment, readers 12A-D repeat their RF signal transmissions at frequent time intervals, and thereby receive different backscatter modulated signals from tags. In one embodiment, an interrogating reader calculates a phase angle for at least two received backscatter signals. Calculating the phase angle can include calculating both an in-phase (I) and quadrature (Q) signal for each modulated backscatter signal. Depending on the number of time intervals and amount of backscatter signals received, the RFID reader may smooth the phase angle calculations. For example, an intermittent interference between the singulated tag and the RFID reader may result in erroneous measurements which the RFID reader can remove from the phase angle calculation. Once phase angles for at least two modulated backscatter signals are calculated, the interrogating reader then compares the calculated phase angles. If the phase angles differ by a predefined amount, the one or more interrogating readers 12A-D determine that the RFID tag 14A is moving.

In another embodiment, once a phase angle is calculated for each backscatter signal, the interrogating reader calculates a Received Signal Strength Indication (RSSI) representing the power present in each backscattered signal. The interrogating reader then compares the calculated RSSI for each of the two received modulated backscatter signals. If the calculated RSSI values differ by a predefined amount, the interrogating reader determines that the RFID tag 14A is moving. In yet another embodiment, one or more interrogating readers calculate both phase angles and RSSI values for each of the modulated backscatter signals. The reader then compares the calculated phase angles and RSSI values for each backscattered signal and detects movement of the RFID tag 14A if the RSSI and phase angle calculated for each backscattered signal differ from one another.

In one embodiment, upon the reader detecting movement of a tag of interest, the reader continues to singulate on the tag. Advantageously, this technique results in several more data points being analyzed by the reader for the tag. For example, in embodiments where the reader is configured to use the EPC Gen 2 Protocol, upon the reader detecting tag movement, the reader increases its read rate of the tag of interest to the exclusion of tags of non-interest. In one embodiment, the reader increases its read rate of the tag of interest from ten (10) times per second to two hundred (200) times per second. As a result, by continuing to singulate on a tag of interest, several more backscatter signals can be provided to the reader to determine whether the tag of interest is moving or not moving.

In an embodiment, the one or more readers 12A-D of the present invention determine a rate of change of the phase angle in the backscatter modulated signals for each singulated tag. If the tag is stationary, the rate of change calculated by the reader for the received backscatter signals is minimal, if any. However, if the tag is moving, the rate of change between the two signals changes at each time interval. In one embodiment, the changing information is used to determine the velocity of a tag.

Advantageously, the RFID readers 12A-D of the present invention can be used to determine whether an item has been stolen (e.g., travels beyond the portal 16 by a certain distance towards a certain direction—outside the store at a certain speed) and if so, identify by item name or number the specific items that were stolen.

For example, in one embodiment, if one or more RFID readers 12A-D determine that a RFID tag is moving towards the portal 16, the one or more readers 12A-D can generate an alert to signal a possible theft. In one embodiment, upon detecting tag movement toward the portal 16, the one or more readers 12A-D query the tag to determine whether or not the particular item has been purchased. Such a query can be based on pre-defined business rules. If the item has not been purchased and the velocity of the tag exceeds a threshold value, the one or more readers 12A-D can generate an alarm to signal a possible theft. If the one or more RFID readers 12A-D determine that a singulated RFID tag is not moving or has been paid for based on the business rule, the one or more readers 12A-D may filter the alert out from other alerts that may meet additional user-defined criteria. Accordingly, various business rules and other user-defined criteria can be applied by the system 10 to generate and filter alerts based on tag movement determination.

Figure 4:
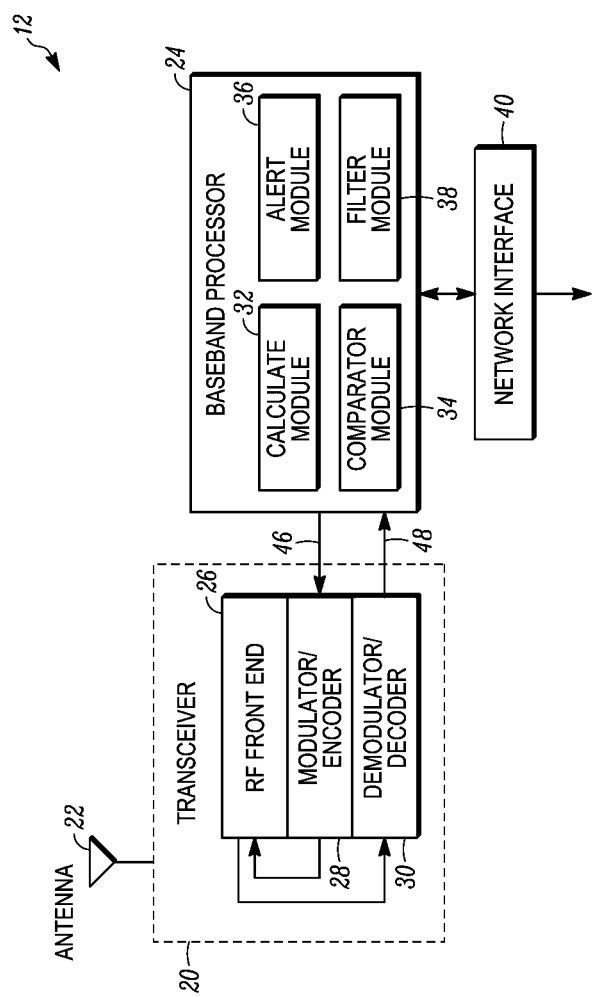
FIG. 4 shows a block diagram of an RFID reader according to the present invention.

Turning now to FIG. 4, a block diagram of an example RFID reader 12 according to the present invention is disclosed. The reader 12 includes one or more antennas 22, a receiver and transmitter portion 20, a baseband processor 24, and a network interface 40. These components of reader 12 may include software, hardware, and/or firmware, or any combination thereof, for performing their functions.

Baseband processor 24 and network interface 40 are optionally present in the reader 12. Baseband processor 24 may be present in reader 12, or may be located remote from reader 12. For example, in an embodiment, network interface 40 may be present in the reader 12 to communicate between the transceiver portion 20 and a remote server that includes baseband processor 24. When the baseband processor 24 is present in the reader 12, the network interface 40 may be optionally present to communicate between the baseband processor 24 and a remote server configured to analyze moving tags. In another embodiment, the network interface 40 is not present in reader 12.

In one embodiment, the reader 12 includes the network interface 40 to interface the reader 12 with a communications network 44. As shown in FIG. 4, the baseband processor 24 and network interface 40 communicate with each other via a communication link 42. The network interface 40 is used to provide an interrogation request 46 to the transceiver portion 20 (optionally through baseband processor 24), which may be received from a remote server coupled to the communications network 44. The baseband processor 24 optionally processes the data of interrogation request 46 prior to being sent to the transceiver portion 20. The transceiver 20 transmits the interrogation request via the antenna 22.

As shown in FIG. 4, the reader 12 includes at least one antenna 22 for communicating with tags 14A-G and/or other readers. The antenna(s) 22 may be any type of reader antenna known to persons skilled in the relevant art(s), including a vertical, dipole, loop, Yagi-Uda, slot, or patch antenna type.

The transceiver portion 20 receives a modulated backscattered signal response via the antenna 22 and outputs a decoded data signal 48 generated from the tag response. The network interface 40 is used to transmit a decoded data signal 48 received from the transceiver portion 20 (optionally through baseband processor 42) to the remote server or process coupled to communications network. The baseband processor 24 optionally can process the data of decoded data signal 48 prior to being sent over the communications network 44.

In embodiments, the network interface 40 enables a wired and/or wireless connection with communications network 44. For example, the network interface 40 may enable a wireless local area network (WLAN) link (including a IEEE 802.11 WLAN standard link), a BLUETOOTH link, and/or other types of wireless communication links. The communications network 44 may be a local area network (LAN), a wide area network (WAN) (e.g., the Internet), and/or a personal area network (PAN).

In embodiments, a variety of mechanisms may be used to initiate an interrogation request by the reader 12. For example, the RFID reader 12 can be activated to send an interrogation request upon an object being detected.

In the example of FIG. 4, the transceiver portion 20 includes a RF front-end 26, a demodulator/decoder 30, and a modulator/encoder 28. These components of the transceiver portion 20 may include software, hardware, and/or firmware, or any combination thereof, for performing their functions. Example description of these components is provided as follows.

As shown in FIG. 4, the modulator/encoder 28 receives interrogation request 46, and is coupled to an input of RF front-end 26. The modulator/encoder 28 encodes interrogation request 46 into a signal format, such as one of FM0 or Miller encoding formats, modulates the encoded signal, and outputs the modulated encoded interrogation signal to RF front-end 26.

The RF front-end 26 may include one or more antenna matching elements, amplifiers, filters, an echo-cancellation unit, a down-converter, and/or an up-converter. The RF front-end 26 receives a tag response signal through antenna 22 and down-converts (if necessary) the response signal to a frequency range amenable to further signal processing. Furthermore, RF front-end 26 receives a modulated encoded interrogation signal from modulator/encoder 28, up-converts (if necessary) the interrogation signal, and transmits the interrogation signal to antenna 32 to be radiated.

The demodulator/decoder 30 is coupled to an output of the RF front-end 26, receiving a modulated tag response signal from RF front-end 26. The demodulator/decoder 30 demodulates the tag response signal. For example, the tag response signal may include backscattered data encoded according to FM0 or Miller encoding formats in an EPC Gen 2 embodiment. Demodulator/decoder 30 outputs decoded data signal 48.

The configuration of transceiver portion 20 shown in FIG. 4 is provided for purposes of illustration, and is not intended to be limiting. Further, transceiver portion 20 may be configured in numerous ways to modulate, transmit, receive, and demodulate RFID communication signals, as would be known to persons skilled in the relevant art(s).

In one embodiment, the baseband processor 24 is incorporated into the reader 12 and includes a central processor unit (CPU), an input-output module, and a memory 74. In one exemplary embodiment, the memory of the processor 24 is configured to include a control module 32, a comparator module 34, an alert module 36, and a filter module 38.

The control module 32 executes a method to detect movement of a single RFID tag. In particular, the control module 32 calculates for each modulated backscatter signal either a phase angle, RSSI value, or both phase angle and RSSI value. The control module 32 then forwards these calculated values to the comparator module 34 for comparison. Based on the comparison, the control module 32 detects movement of a particular RFID tag. Details of the method executed by the control module are discussed in connection with FIG. 4.

The comparator module 34 compares calculated phase angle and RSSI values of modulated backscatter signals in response to requests from the control module 32 and provides results of comparisons to the control module 32. In one embodiment, the comparator module 32 compares a calculated velocity for a singulated tag to a predetermined value and provides results of that comparison to the control module 32.

The alert module 36 of the processor 24 generates alerts for detected moving tags. In one embodiment, the alert module 36 generates one or more events for a tag based on the velocity calculated for the tag. For example, in one embodiment, if the calculated velocity of a singulated tag exceeds a threshold value, the alert module generates an event that is transmitted to a remote server or process for subsequent processing. In another embodiment, the alert module 36 applies business rules to tags based on the calculated velocity. For example, if the velocity calculated for a tag exceeds a threshold value and it is determined that the item affixed to the tag has not been paid for by querying the tag, the alert module 36 generates an alert.

The filter module 38 provides a level of granularity for analyzing alerts and events generated by the alert module 36. In one embodiment, the filter module 38 prioritizes alerts generated by the alert module 36 based on how fast a tag is moving. For example, determining how fast a tag is moving can determine if a product affixed to the tag is moving through a portal or just on a shelf near the portal. The filter module 38 can prioritize those alerts passing through the portal for further analysis.

Figure 5:
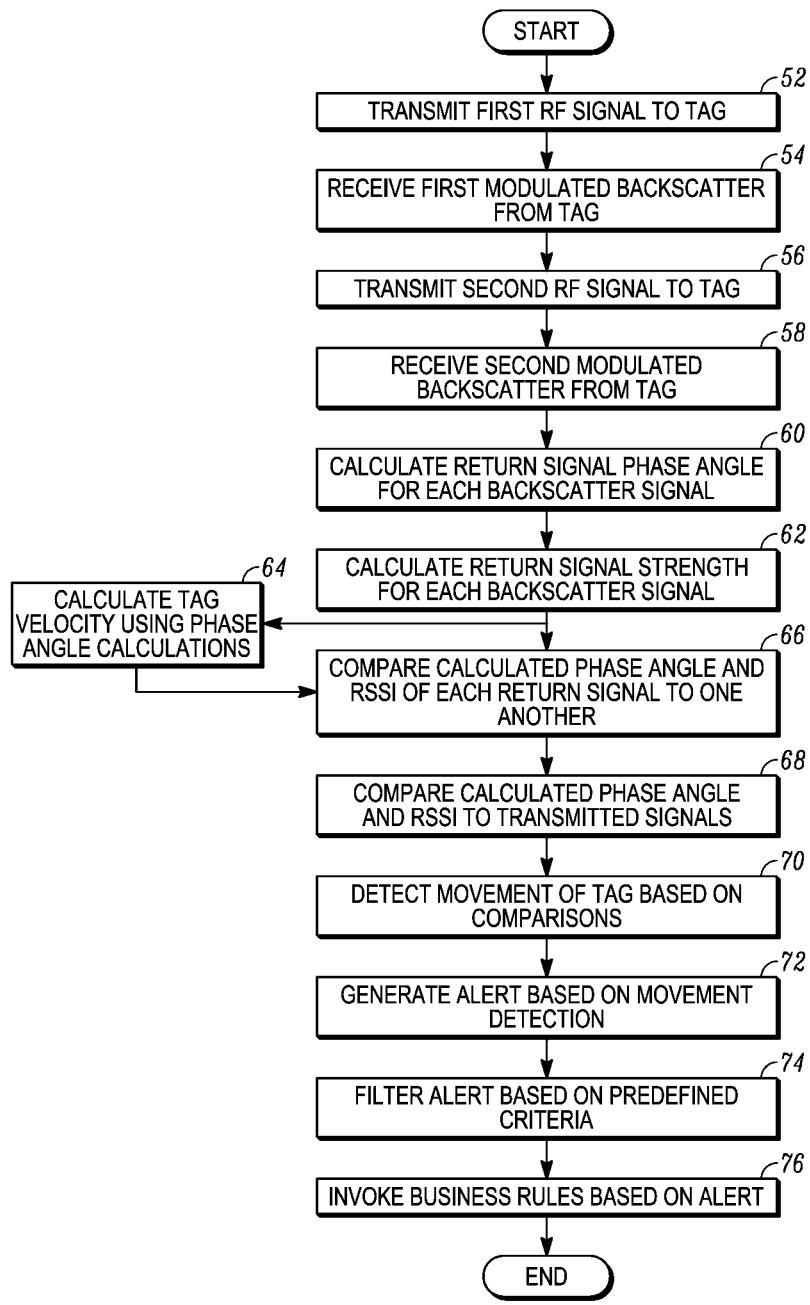
FIG. 5 illustrates an exemplary method executed by an RFID reader of the present invention to detect RFID tag movement.

Turning now to FIG. 5, further details of an example method executed by the control module 32 of the RFID reader 12 shown in FIG. 4 are disclosed. First, as shown in FIG. 5, the control module 32 of the reader 12 transmits a first RF signal to the singulated tag 52. In response to the first RF signal, the reader 12 receives a first modulated backscatter signal back from the tag 54. Next, the reader 12 transmits a second RF signal to the tag 56 and receives back a second modulated backscatter signal from the tag 58. Although FIG. 5 describes only two (2) transmitted and received signals between the reader and singulated tag, the present method can be used with more than two (2) transmitted and received signals.

Next, the control module 32 calculates a signal phase angle for each of the received backscatter signals 60. This step can include calculating both an in-phase (I) and quadrature (Q) signal for each back scattered signal. In an embodiment, the control module 32 also calculates an RSSI value for each backscatter signal 62. The control module 32 can also calculate a tag velocity value for the singulated tag using the phase angle calculations 64.

In one embodiment, the control module 32 smoothes calculations based on the number of modulated backscatter signals received from the tag. Next, the control module 32 invokes the comparator module 34 to compare the calculated phase angle and RSSI value of each backscatter signal to one another 66. In one embodiment, the comparator module 34 compares the calculated phase angle and RSSI values to each of the respective transmitted signals 68. If the values calculated for each of the modulated backscatter signals differ, the control module 32 detects movement of the RFID tag 70. In one embodiment, as explained previously, the control module 32 may invoke the alert module 36 to generate an event or alert based on the comparison 72. Further, as described previously, in an embodiment, the filter module 38 may prioritize the alert 74 based on predefined business rules 76.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of detecting movement of a RFID tag comprising:
   transmitting a plurality of RF signals from at least one RFID reader to the RFID tag;
   receiving at least two modulated backscattered signals from the tag in response to the transmission of signals;
   comparing the at least two backscattered signals to one another;
   detecting movement of the RFID tag based on the comparison;
   calculating a velocity of the tag based on the detected movement;
   based on the calculated velocity, querying the tag to determine whether an item has been purchased; and
   generating an alert based on the calculated velocity of the tag and the determination of whether an item has been purchased.

2. The method of claim 1, further comprising singulating the RFID tag prior to comparing the at least two modulated backscattered signals.

3. The method of claim 1, wherein comparing the at least two back scattered signals comprises:
   calculating a return signal strength indicator (RSSI) for each of the backscattered signals;
   comparing the RSSI of each backscattered signal to one another; and
   detecting movement of the RFID tag if the RSSI calculated for each backscattered signal differ from one another.

4. The method of claim 1, wherein comparing the at least two backscattered signals comprises:
   calculating a return signal phase angle for each of the backscattered signals;
   comparing the phase angle of each backscattered signal to one another; and
   detecting movement of the RFID tag if the phase angle calculated for each backscattered signal differ from one another; and
   wherein calculating the phase angle comprises calculating an in-phase (I) and quadrature (Q) signal for each backscattered signals.

5. The method of claim 1, further comprising:
   receiving the at least two modulated backscattered signals on an antenna of the at least one RFID reader; and
   calculating a velocity of the tag relative to the antenna.

6. The method of claim 1, further comprising smoothing the at least two modulated backscattered signals.

7. The method of claim 1, comprising filtering the alert by interrogating a field of the tag.

8. The method of claim 1, wherein querying the tag comprises:
   comparing the calculated velocity to a threshold to produce a comparison; and
   determining whether to query the tag based on the comparison.

9. An RFID reader including at least one antenna, the RFID reader including a processor and memory including memory storing instructions that, in response to a request, cause the processor to: transmit a plurality of RF signals to an RFID tag through the at least one antenna, compare at least two backscattered signals from the tag to one another in response to transmission of signals through the antenna, detect movement of the RFID tag based on the comparison, calculate a velocity of the tag based on the detected movement, based on the calculated velocity, query the tag to determine whether an item has been purchased, and generate an alert based on the calculated velocity of the tag and the determination of whether an item has been purchased.

10. The RFID reader of claim 9, wherein the memory stores instructions that, in response to receiving the request, cause the processor to singulate the RFID tag prior to comparing the at least two backscattered signals.

11. The RFID reader of claim 9, wherein the memory stores instructions that, in response to receiving the request, cause the processor to:
   calculate a return signal strength indicator (RSSI) for each of the backscattered signals;
   compare the RSSI of each backscattered signal to one another; and
   detect movement of the RFID tag if the RSSI calculated for each backscattered signal differ from one another.

12. The RFID reader of claim 9, wherein the memory stores instructions that, in response to receiving the request, cause the processor to:
   calculate a return signal phase angle for each of the backscattered signals;
   compare the phase angle of each backscattered signal to one another; and
   detect movement of the RFID tag if the phase angle calculated for each backscattered signal differ from one another; and
   wherein calculation of the phase angle comprises calculation of an in-phase (I) and quadrature (Q) signal for each backscattered signals.

13. The RFID reader of claim 9, wherein the memory stores instructions that, in response to receiving the request, cause the processor to calculate a velocity of the tag relative to the antenna in response to receiving the at least two modulated backscattered signals on an antenna of the at least one RFID reader.

14. The RFID reader of claim 9, wherein the memory stores instructions that, in response to receiving the request, cause the processor to smooth the at least two modulated backscattered signals.

15. The RFID reader of claim 9, wherein the memory stores instructions that, in response to receiving the request, cause the processor to filter the alert by interrogating a field of the tag.

16. The RFID reader of claim 9, wherein the memory stores instructions that cause the processor to query the tag by:
   comparing the calculated velocity to a threshold to produce a comparison; and
   determining whether to query the tag based on the comparison.

17. An RFID system comprising:
   a plurality of RFID tags;
   at least one RFID reader for communicating with the plurality of RFID tags, the at least one RFID reader configured to transmit a plurality of RF signals to one of the plurality of RFID tags, compare at least two backscattered signals received from the one of the plurality of tags to one another, detect movement of the one of the plurality of tags based on the comparison, calculate a velocity of the tag based on the detected movement, based on the calculated velocity, query the tag to determine whether an item has been purchased, and generate an alert based on the calculated velocity of the tag and the determination of whether an item has been purchased.

18. The RFID system of claim 17, wherein the RFID reader calculates a return signal strength indicator (RSSI) for each of the backscattered signals, compares the RSSI of each backscattered signal to one another, and detects movement of the one of the plurality of RFID tags if the RSSI calculated for each backscattered signal differ from one another.

19. The RFID system of claim 17, wherein the RFID reader is configured to query the tag by:
   comparing the calculated velocity to a threshold to produce a comparison; and
   determining whether to query the tag based on the comparison.

\* \* \* \* \*